(12) United States Patent
Sampedro Diaz et al.

(10) Patent No.: US 9,202,375 B2
(45) Date of Patent: *Dec. 1, 2015

(54) NAVIGATION SYSTEM FOR A MOTOR VEHICLE

(75) Inventors: Luis Sampedro Diaz, Mountain View, CA (US); Daniel Rosario, Ingolstadt (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 89 days.

This patent is subject to a terminal disclaimer.

(21) Appl. No.: 12/392,050

(22) Filed: Feb. 24, 2009

(65) Prior Publication Data

US 2010/0017121 A1   Jan. 21, 2010

Related U.S. Application Data

(63) Continuation-in-part of application No. 12/175,089, filed on Jul. 17, 2008.

(51) Int. Cl.
*G01C 21/32* (2006.01)
*G08G 1/0969* (2006.01)
*G01C 21/36* (2006.01)

(52) U.S. Cl.
CPC .......... *G08G 1/0969* (2013.01); *G01C 21/3667* (2013.01)

(58) Field of Classification Search
CPC combination set(s) only.
See application file for complete search history.

(56) References Cited

U.S. PATENT DOCUMENTS

| | | | |
|---|---|---|---|
| 6,208,859 B1 | 3/2001 | Halvorson | |
| 6,377,210 B1 * | 4/2002 | Moore | 342/357.4 |
| 6,691,128 B2 * | 2/2004 | Natesan et al. | 701/430 |
| 6,826,474 B2 * | 11/2004 | Miyahara et al. | 701/533 |
| 7,027,916 B2 * | 4/2006 | Furukawa | 701/533 |
| 7,043,357 B1 | 5/2006 | Stankoulov et al. | |
| 7,532,978 B2 * | 5/2009 | Upparapalli et al. | 701/420 |
| 7,660,667 B2 * | 2/2010 | Furukawa | 701/420 |
| 8,437,958 B2 * | 5/2013 | Krause et al. | 701/533 |
| 2002/0128768 A1 * | 9/2002 | Nakano et al. | 701/202 |

(Continued)

FOREIGN PATENT DOCUMENTS

| | | |
|---|---|---|
| DE | 698 15 940 | 6/2004 |
| EP | 0 875 730 | 11/1998 |

(Continued)

OTHER PUBLICATIONS

Periodical AUTOCONNECT 2005, Vereinigte Motor-Verlage GmbH & Co. KG (United Motor Publishing House, Inc.), Leuschnerstr. 1, 70174 Stuttgart, Federal Republic of Germany, pp. 18 and 21.

*Primary Examiner* — Jonathan L Sample
(74) *Attorney, Agent, or Firm* — Kenyon & Kenyon LLP (57) ABSTRACT

In a method for operating a navigation system for a motor vehicle having an offboard data memory, spatially separated from the motor vehicle, having data packets of visual map information, divided by region, as well as a display arranged in the motor vehicle, a selection of data packets provided for transmission to the motor vehicle and/or their sequence occur as a function of the resolution of the display, the location of the motor vehicle, an assumed route of the motor vehicle and/or the bandwidth of a communication connection provided for the transmission, the selected data packets being transmitted to the motor vehicle (e.g., in the selected sequence), and visual map information from data packets transmitted to the motor vehicle being represented by the display.

13 Claims, 6 Drawing Sheets

(56) References Cited

U.S. PATENT DOCUMENTS

| | | | |
|---|---|---|---|
| 2002/0177948 A1* | 11/2002 | Upparapalli et al. | 701/209 |
| 2003/0008670 A1 | 1/2003 | Katoh | |
| 2004/0236498 A1* | 11/2004 | Le et al. | 701/200 |
| 2005/0043880 A1* | 2/2005 | Yamane et al. | 701/200 |
| 2005/0137787 A1* | 6/2005 | Furukawa | 701/201 |
| 2005/0137789 A1* | 6/2005 | Furukawa | 701/202 |
| 2005/0270299 A1* | 12/2005 | Rasmussen et al. | 345/552 |
| 2006/0025923 A1* | 2/2006 | Dotan et al. | 701/207 |
| 2006/0095199 A1 | 5/2006 | Lagassey | |
| 2006/0167784 A1 | 7/2006 | Hoffberg | |
| 2007/0049260 A1 | 3/2007 | Yuhara et al. | |
| 2007/0063875 A1* | 3/2007 | Hoffberg | 340/995.1 |
| 2007/0087756 A1 | 4/2007 | Hoffberg | |
| 2007/0112504 A1* | 5/2007 | Krause et al. | 701/200 |
| 2007/0233369 A1* | 10/2007 | Ng et al. | 701/208 |
| 2007/0271035 A1* | 11/2007 | Stoschek et al. | 701/209 |
| 2007/0288162 A1* | 12/2007 | Furukawa | 701/210 |
| 2008/0046172 A1* | 2/2008 | Ames et al. | 701/208 |
| 2008/0228393 A1* | 9/2008 | Geelen et al. | 701/208 |
| 2008/0252485 A1 | 10/2008 | Lagassey | |
| 2009/0170537 A1 | 7/2009 | Mauti | |
| 2010/0017121 A1* | 1/2010 | Diaz et al. | 701/209 |

FOREIGN PATENT DOCUMENTS

| | | |
|---|---|---|
| FR | 2 634 707 | 2/1990 |
| WO | 2007/115615 | 10/2007 |

* cited by examiner

NAVIGATION SYSTEM FOR A MOTOR VEHICLE

CROSS-REFERENCE TO RELATED APPLICATIONS

The present application is a continuation-in-part of U.S. patent application Ser. No. 12/175,089, filed on Jul. 17, 2008, which is expressly incorporated herein in its entirety by reference thereto.

FIELD OF THE INVENTION

The present invention relates to a method for operating a navigation device for a motor vehicle having an offboard data memory spatially separated from the motor vehicle, in which visual or imagery map information is stored.

BACKGROUND INFORMATION

PCT International Published Patent Application No. WO 2007/115615 describes a navigation system for a motor vehicle, the navigation system including a motor vehicle, a server spatially separated from the motor vehicle and a wireless communication connection between the server and the motor vehicle for the time-staggered transmission of a first item of navigation information and at least of a second item of navigation information from the server to the motor vehicle, and satellite images being used as visual map information.

European Published Patent Application No. 0 875 730 and German Published Patent Application No. 698 15 940 describe a map information display device for use in a vehicle navigation device having a data conversion device for recording points of map data according to a map from a viewpoint through a viewing line originating from the viewpoint and having an angle of depression with respect to the plane of the map, and for perspectively projecting the points of the map data onto a viewing plane, which is fixed perpendicularly to the viewing line and has a predefined distance from the viewpoint in order to generate map display data. This produces a bird's eye view of a surrounding area. A navigation system having a bird's eye view of a surrounding area is also described in French Published Patent Application No. 2 634 707 as well as in the periodical autoconnect 2005, Vereinigte Motor-Verlage GmbH & Co. KG, Leuschnerstr. 1, 70174 Stuttgart, Germany, pages 18 and 21.

SUMMARY

Example embodiments of the present invention provide an improved motor vehicle having a navigation system.

A method is provided for operating a navigation system for a motor vehicle having an offboard data memory, spatially separated from the motor vehicle, having data packets of visual or imagery map information, divided by region, as well as a display arranged in the motor vehicle, a selection of data packets provided for transmission to the motor vehicle and/or their sequence occurring as a function of the resolution of the display, the location of the motor vehicle, an assumed route of the motor vehicle and/or the bandwidth of a communication connection provided for the transmission, the selected data packets being transmitted to the motor vehicle (e.g., in the selected sequence), and visual map information from data packets transmitted to the motor vehicle being represented by the display.

Visual map information may include, for example, satellite images, e.g., map segments true to detail, three-dimensionally represented artificial or genuine images. Visual map information may include, e.g., artificial or real images that correspond to the perspective from which the driver of the motor vehicle sees the real world.

An assumed route of the motor vehicle includes, e.g., a suggested route for the motor vehicle (to a destination) that is calculated, in particular, using an onboard navigation system.

The selection of data packets provided for transmission to the motor vehicle and/or their sequence may occur additionally as a function of admissible driving directions.

Data packets may be provided for transmission to the motor vehicle, which at a certain resolution of the display are (or would be) displayed on the display along the assumed route of the motor vehicle. The sequence of the data packets provided for transmission to the motor vehicle may depend on the proximity of the region represented by them with respect to the location of the motor vehicle. From among the data packets provided for transmission to the motor vehicle, those concerning regions that are closer to the location of the motor vehicle may be transmitted before those concerning regions that are further away from the location of the motor vehicle.

Data packets may be provided for transmission to the motor vehicle, which at a certain resolution of the display are allocated to regions (in the area of a route junction or route option) which touch a circle around a (or the) route junction or route option having a diameter corresponding to the screen size of the display.

In the case of a route junction or route option—if the bandwidth of the communication connection is not fully utilized—at least one additional data packet may be provided for transmission to the motor vehicle, which is situated at the route junction or route option, but not along the assumed route of the motor vehicle.

The resolution of the display corresponds, e.g., to the currently set resolution of the display and is thus, e.g., a function of the set scale. There may be a provision for the aforementioned method to be repeated at different resolutions such that the desired data are quickly available when an operator changes the resolution of the display, in particular by changing the represented scale.

A navigation system for a motor vehicle, e.g., a navigation system for carrying out a method having one or more of the aforementioned features, includes an offboard data memory, spatially separated from the motor vehicle, having data packets of visual or imagery map information divided by region, a wireless communication connection between the offboard data memory and the motor vehicle for transmitting selected data packets to the motor vehicle, a display arranged in the motor vehicle for representing visual map information of data packets provided for transmission to the motor vehicle and a computing device for selecting data packets provided for transmission to the motor vehicle and/or their sequence as a function of the resolution of the display, the location of the motor vehicle, an assumed route of the motor vehicle and/or the bandwidth of the communication connection. The motor vehicle may have a navigation system for determining a route for the motor vehicle.

A wireless communication connection may include, e.g., a communication connection that includes a wireless portion. It is not necessary for a wireless communication connection to have an entire transmission path that is wireless. The aforementioned computing device may be arranged outside of the motor vehicle and spatially separated from the motor vehicle, but may be integrated in the motor vehicle, e.g., in its navigation system.

A motor vehicle may include, e.g., a land vehicle that may be used individually in road traffic. Motor vehicles are specifically not limited to land vehicles having an internal combustion engine.

Further features and aspects of example embodiments of the present invention are described in more detail below with reference to the appended Figures.

DETAILED DESCRIPTION

Figure 1:
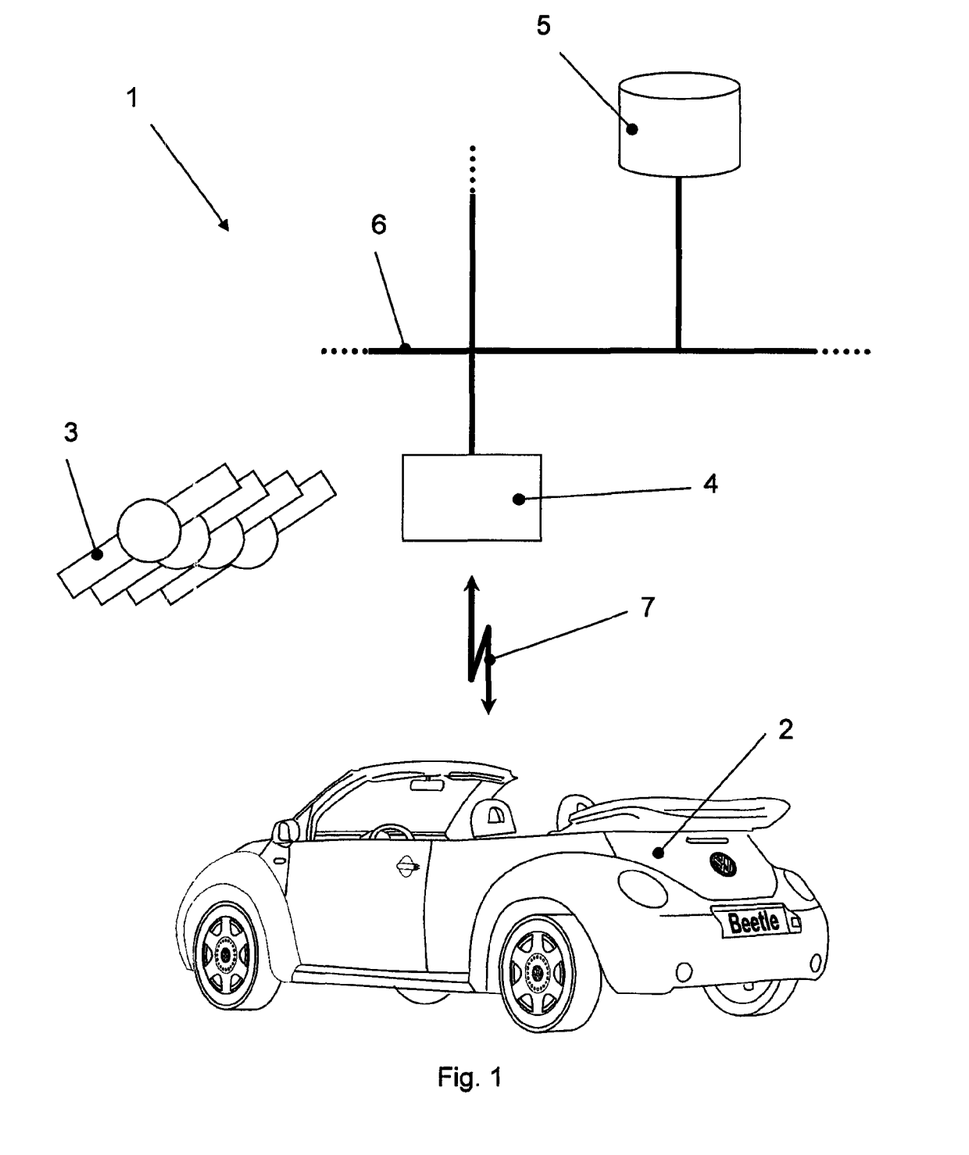
FIG. 1 schematically illustrates a navigation system.

FIG. 1 schematically illustrates a navigation system 1. Navigation system 1 includes a motor vehicle 2—shown in more detail in FIG. 2—and an offboard data memory 5, spatially separated from motor vehicle 2, having data packets of visual map information divided by region. Between offboard data memory 5 and motor vehicle 2, data may be transmitted via a (e.g., bidirectional) communication connection. In particular, selected data packets are transmitted from offboard data memory 5 to motor vehicle 2.

The communication connection between offboard data memory 5 and motor vehicle 2 includes an Internet connection 6 between offboard data memory 5 and a node 4, and a wireless communication connection 7 between node 4 and motor vehicle 2. The communication connection between offboard data memory 5 and motor vehicle 2, e.g., the communication connection including Internet connection 6, node 4 and wireless communication connection 7, is an exemplary arrangement for a wireless communication connection. Wireless communication connection 7 may be WLAN, WIFI, WIMAX, RF, mobile radio, etc. It may be provided that a selection between alternative wireless communication connections is (e.g., automatically) made as a function of certain criteria. Such criteria are, for example, cost, availability and/or bandwidth, etc.

Figure 2:
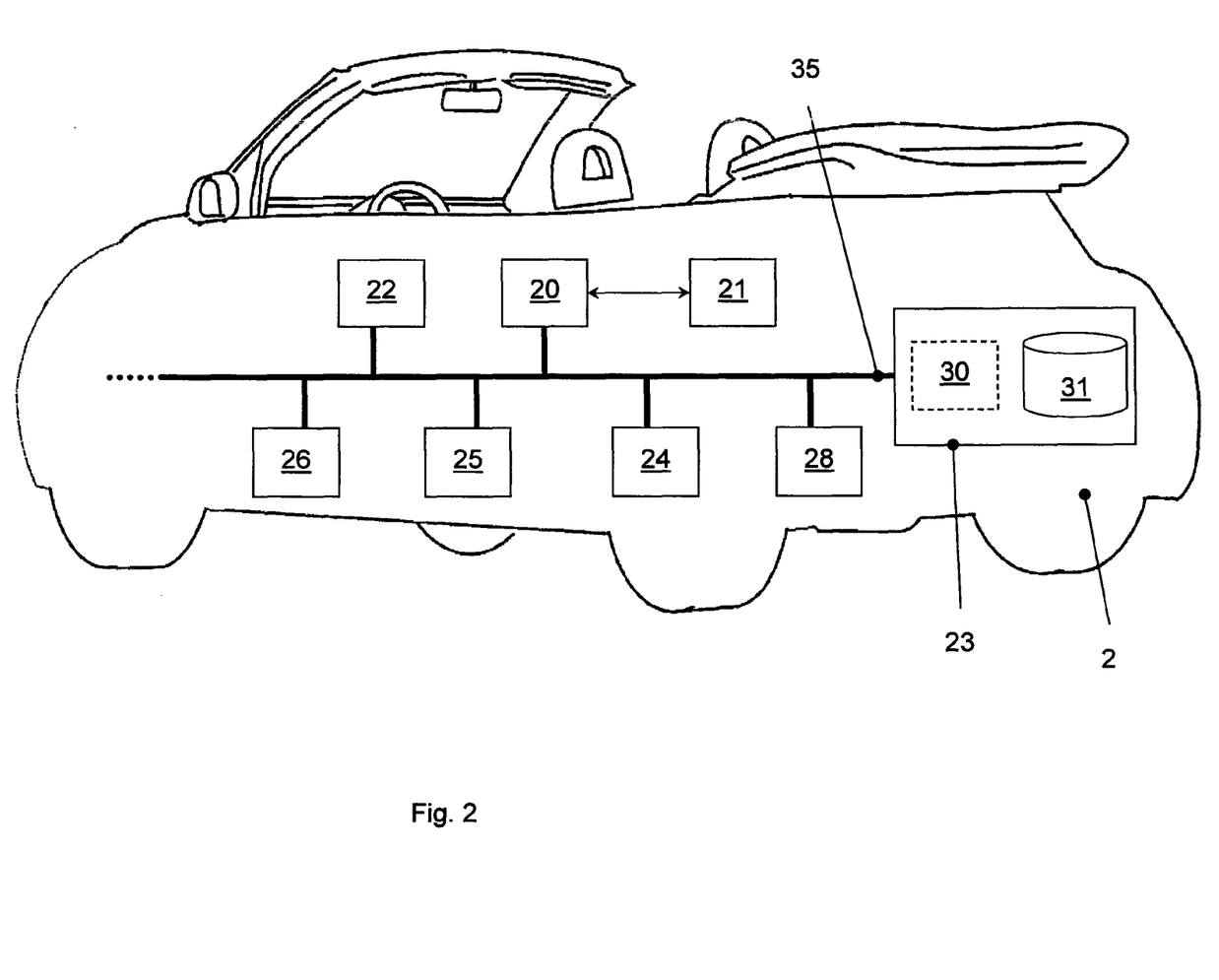
FIG. 2 schematically illustrates a motor vehicle.

Motor vehicle 2 includes a position-finding system 30—in the present exemplary embodiment, one integrated into an (e.g., onboard) navigation system 23 of motor vehicle 2—for determining the position of motor vehicle 2, (e.g., as well as possibly the heading of motor vehicle 2 and/or the onboard time) as a function of signals 3 transmitted by satellites. Motor vehicle 2 additionally includes a human-machine interface 21, such as a touch screen, for operating navigation system 23 using a display control unit 20. Human-machine interface 21 includes a display. Display control unit 20 and human-machine interface 21 form an operating device, by which, in addition to navigation system 23, other components of the motor vehicle may be operated as well, such as an infotainment system 24, an air-conditioning system 25 and a telephone or a telephone interface 26, etc. Infotainment system 24, air-conditioning system 25, telephone interface 26 and the navigation system are connected to display control unit 20 in a data link via a bus system 35. Moreover, an interface 22 for wireless communication connection 7 is coupled to bus system 35. Data packets of visual map information are input via interface 22 and are transmitted via bus system 35 to a memory 31 of navigation system 23. Memory 31 outputs those items of visual map information that are currently displayed or are to be represented via human-machine interface 21.

As explained in the following on the basis of examples, the selection of data packets provided for transmission to the motor vehicle or their sequence occurs as a function of the resolution of the display of human-machine interface 21, of the location of motor vehicle 2, an assumed route of motor vehicle 2 and optionally the bandwidth of the communication connection that includes Internet connection 6, node 4 and wireless communication connection 7.

Figure 3:
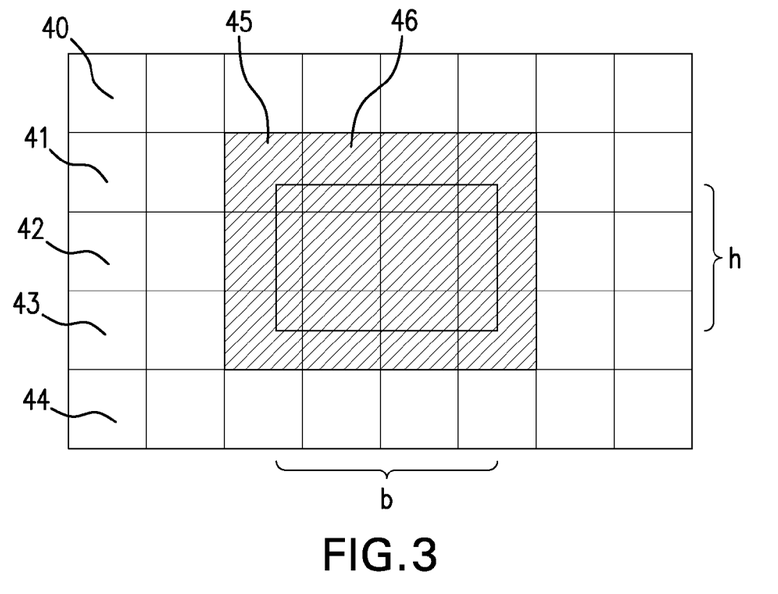
FIG. 3 schematically illustrates a division into regions (according to a grid) and regions marked with respect to data packets provided for transmission.

Data packets that are stored in offboard data memory 5 are divided by region, e.g., the visual map information—as shown in FIG. 3—are subdivided into regions 40, 41, 42, 43, 44, 45, 46, the visual map information of one region 40, 41, 42, 43, 44, 45, 46 respectively forming one data packet, or forming a series of one or more data packets. Those data packets 45, 46 are selected for transmission whose regions are or would be displayed by the display of human-machine interface 21 at a certain resolution of the display of human-machine interface 21, e.g., the currently set resolution of the display of human-machine interface 21. The rectangle indicated by reference numeral 50 designates an example of a region that would be reproduced at a set or assumed resolution of the display of human-machine interface 21. In this instance, reference symbol b indicates the width of the displayed region and reference symbol h indicates the height of the displayed region or the width of the display of human-machine interface 21 and the height of the display of human-machine interface 21. The regions of the data packets consequently provided for transmission are shaded in FIG. 3.

Figure 4:
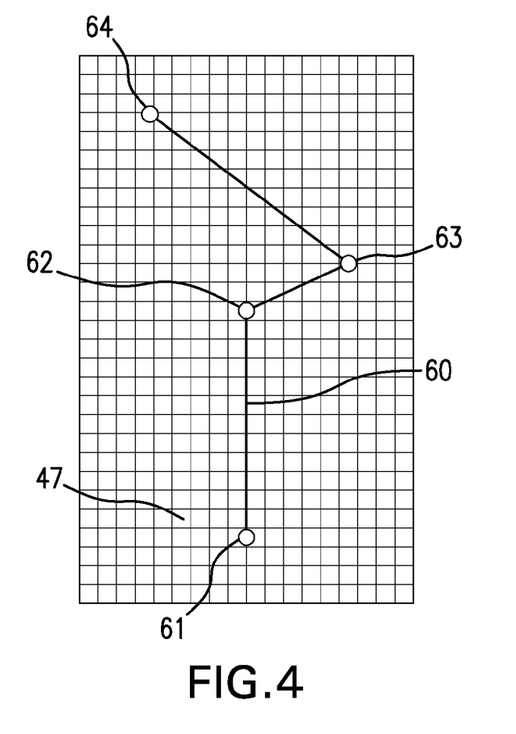
FIG. 4 schematically illustrates a division into regions having a superposed route.
Figure 5:
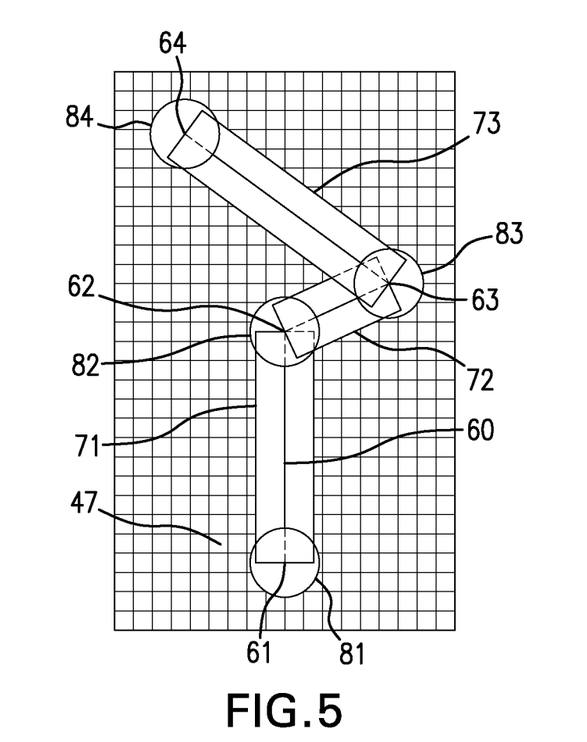
FIG. 5 schematically illustrates a division into regions having a superposed route and regions indicated by corridors with respect to data packets provided for transmission.
Figure 6:
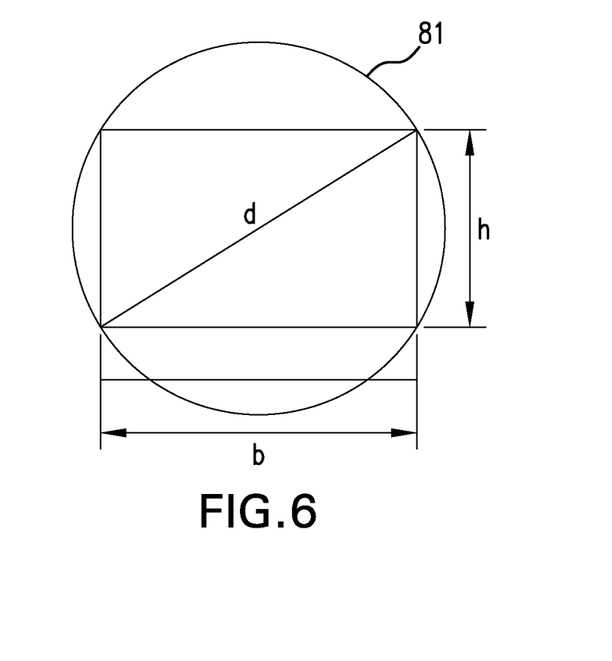
FIG. 6 schematically illustrates a circle for indicating regions with respect to data packets provided for transmission.

Not only those data packets are transmitted, however, that are required at a current point in time, but also data packets are transmitted that correspond to regions which are expected to be displayed. These are in particular regions along an expected route of motor vehicle 2. An expected route of a motor vehicle may include, e.g., a route to a desired destination ascertained or suggested by a navigation system of the motor vehicle and/or a predicted route based on the current direction of the vehicle and knowledge of user behavior and habits. The exemplary embodiment shown in FIG. 4 shows a route 60 ascertained or suggested by navigation system 23 of motor vehicle 2. In this instance, reference numerals 61, 62, 63, 64 indicate route junctions such as forks, intersections, roundabouts, etc., at which it is possible to diverge from route 60. Squares 47 indicate the boundaries of regions assigned to individual data packets. For selecting the data packets that would be displayed along route 60 of motor vehicle 1 in the display of human-machine interface 21 at the selected resolution of the display of human-machine interface 21, a corridor of width b is drawn around route 60, as shown in FIG. 5. Those data packets are provided for transmission whose regions touch this corridor. Respective corridors are indicated in FIG. 5 by reference numerals 71, 72 and 73. In addition, data packets are transmitted whose regions touch a circle 81, 82, 83, 84 around route junctions 61, 62, 63, the diameter of circles 81, 82, 83, 84—as shown in FIG. 6—corresponding to the screen size of the display of human-machine interface 21 at the set or assumed resolution, e.g., $$d=\sqrt{b^2+h^2}$$

Figure 7:
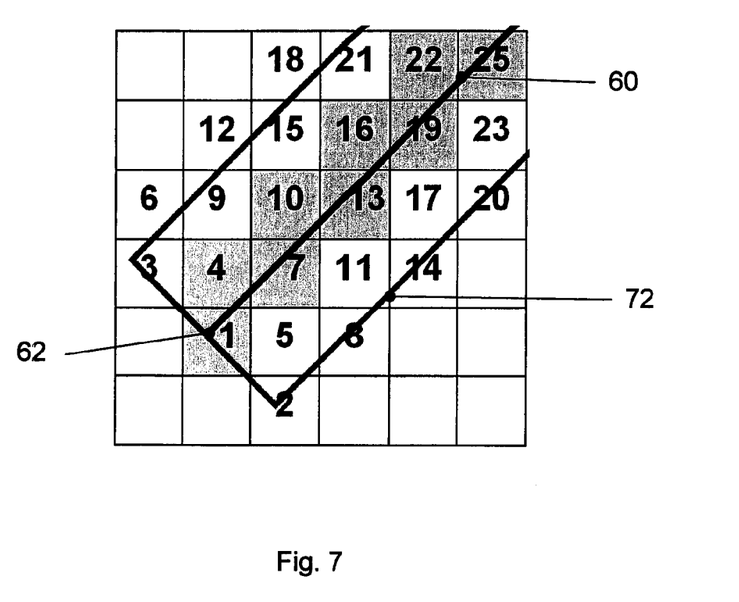
FIG. 7 schematically illustrates a sequence of designated regions with respect to data packets provided for transmission.

With respect to the sequence of the transmission of the data packets provided for transmission to motor vehicle 2, those data packets concerning regions that are closer to the location of motor vehicle 2 are transmitted before those concerning regions that are further away from the location of motor vehicle 2. This is shown in an exemplary manner in FIG. 7 for corridor 72 on the assumption that motor vehicle 2 is located at route junction 62. The numerals indicated in the squares in FIG. 7 refer to the sequence of the transmission of the data packets associated with these regions.

Figure 8:
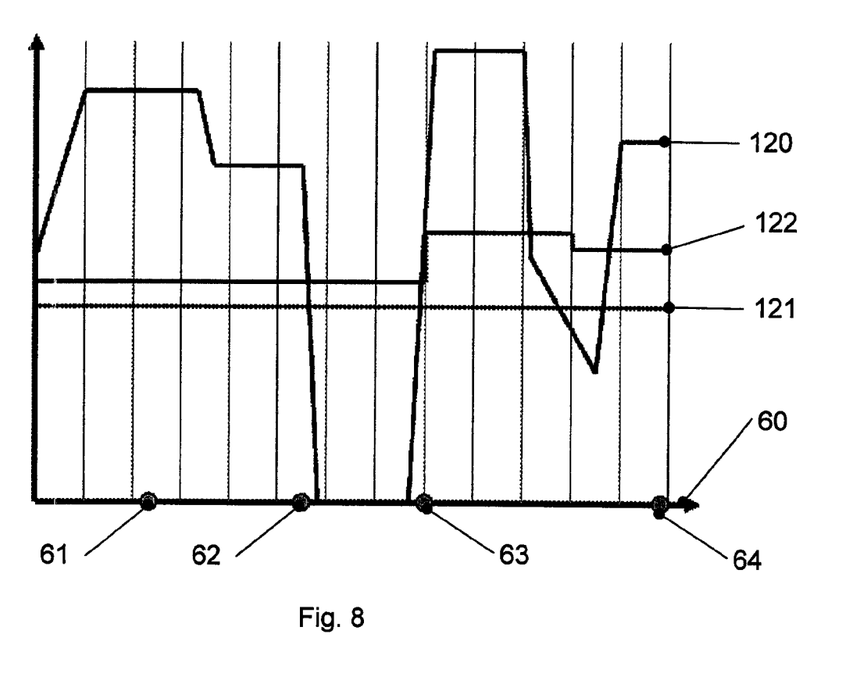
FIG. 8 is a graph in which the bandwidth of a communication connection and a required bandwidth is plotted over a route.

FIG. 8 is a graph in which available bandwidth 120 of the communication connection between offboard data memory 5 and motor vehicle 2 is plotted over route 60. Reference numeral 121 indicates the bandwidth that must be available in order to transmit the data packets according to the described algorithm.

Figure 9:
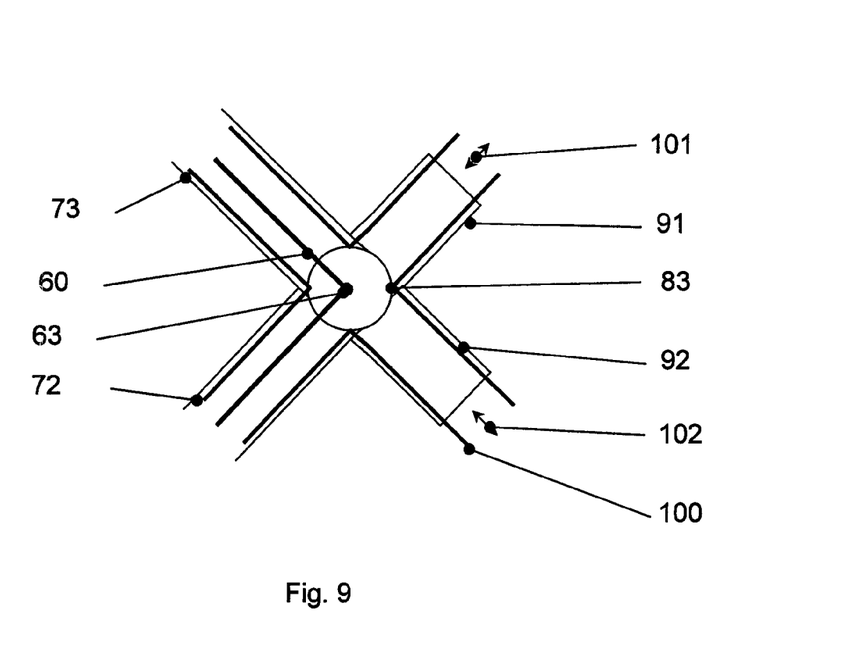
FIG. 9 schematically illustrates an intersection.

If—as in the present exemplary embodiment—bandwidth 120 of the communication connection between offboard data memory 5 and motor vehicle 2 is not fully utilized, then there may be an additional provision to provide additional data packets for transmission to motor vehicle 2, which are located on a route junction, but not along route 60 of the motor vehicle. This is explained in the following in an exemplary manner with reference to FIGS. 9 and 10. With respect to the method described so far, the data packets whose regions touch corridors 71 and 72 as well as circle 83 are transmitted in the area of intersection 100 or 100' (e.g., double arrows 101 and 102 indicating the possible directions of travel) corresponding to route junction 63 shown in FIGS. 9 and 10. If sufficient bandwidth 120 is available, additionally those data packets are transmitted whose associated regions touch the corridors indicated by reference numerals 91 and 92. This ensures that the desired visual map information is available as quickly as possible in the event of a divergence from the planned route.

The information about the bandwidth along a path may be obtained at any given point by querying a server. The server may provide predicted/expected bandwidth values along the calculated path based on historical bandwidth values along that same path or even real-time user-reported bandwidth values other vehicles are experiencing in specific locations along the path.

An aspect of knowing the bandwidth along a path is that it allows to better plan and compare how much information will be needed versus how much information can be downloaded. If the predicted or expected bandwidth along a path is lower than the minimum required, the navigation system may reduce the zoom level (e.g., reduce the resolution of the imagery) the user is trying to display. For example, reducing the resolution by half means reducing the data requirement by a factor of 4. After downloading the data of the path in a lower resolution, the navigation system may zoom-in digitally in order to adjust the zoom value to the input of the user or it may display the data in its original resolution.

In addition to bandwidth along a path, the actual cost of data acquisition may also be calculated, shared, and optimized. For example, in a roaming area, excessive data acquisition may be avoided to avoid, reduce, or minimize additional charges. Furthermore, quality of data may be taken into account. For example, that an area has poor coverage or that a local provider is corrupting data may be recorded and shared among vehicles.

Figure 10:
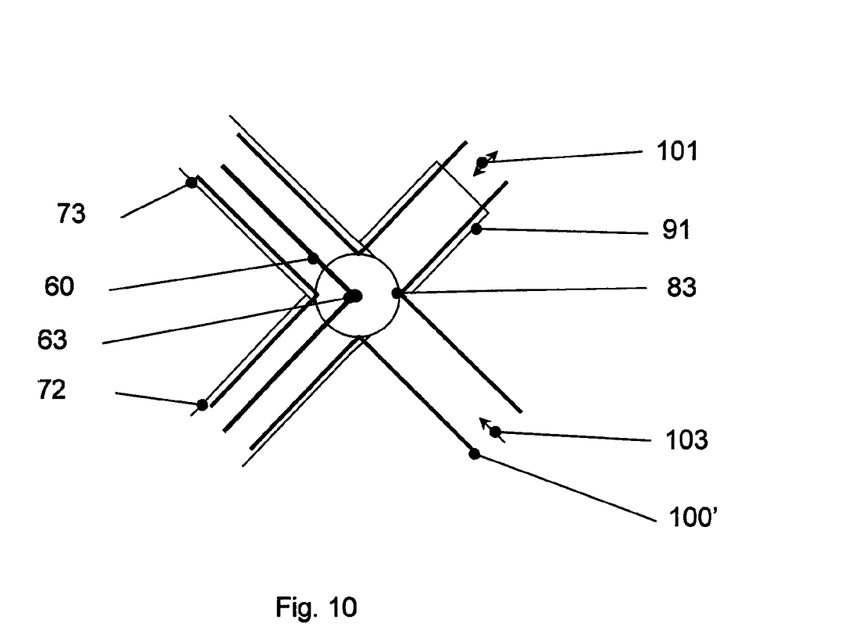
FIG. 10 schematically illustrates an intersection.

In another option, as illustrated in exemplary fashion in FIG. 10, traffic routing may be additionally taken into account. In this instance, in FIG. 10, double arrow 102 is replaced by arrow 103, which symbolizes that the segment of the road associated with this arrow is a one-way street, starting from which one is not allowed to turn in from route 60. In this instance, only those data packets are additionally transmitted whose associated regions touch the corridor indicated by reference numeral 91.

The method described with reference to FIG. 3 to FIG. 10 is implemented on a computing device that is, e.g., part of navigation system 23.

LIST OF REFERENCE CHARACTERS

| | |
|---|---|
| 1 | navigation system |
| 2 | motor vehicle |
| 3 | satellite |
| 4 | node |
| 5 | offboard data memory |
| 6 | internet connection |
| 7 | wireless communication connection |
| 20 | display control unit |
| 21 | human-machine interface |
| 22 | interface |
| 23 | navigation system |
| 24 | infotainment system |
| 25 | air-conditioning system |
| 26 | telephone interface |
| 30 | position-finding system |
| 31 | memory |
| 35 | bus system |
| 40, 41, 42, 43, 44, 45, 46, 47 | region |
| 50 | rectangle |
| 60 | route, route suggestion |
| 61, 62, 63, 64 | route junction |
| 71, 72, 73, 91, 92 | corridor |
| 81, 82, 83, 84 | circle |
| 100, 100' | intersection |
| 101, 102 | double arrow |
| 103 | arrow |
| 120 | bandwidth of a communication connection along a route |
| 121, 122 | required bandwidth of a communication connection along a route |
| b | width |
| h | height |
| d | screen size |

What is claimed is:

1. A method for operating a navigation system for a motor vehicle having an offboard data memory, spatially separated from the motor vehicle, having data packets for transmission to the motor vehicle via a communication connection having a bandwidth, divided by region, of visual map information and a display arranged in the motor vehicle, comprising:

selecting at least one of (a) data packets provided for transmission to the motor vehicle or (b) a sequence of the data packets, the selecting occurring as a function of at least one of (a) a resolution of the display, (b) at least one of (i) a chosen or (ii) an available resolution of data, (c) a location of the motor vehicle, (d) an assumed route of the motor vehicle, or (e) the bandwidth of the communication connection provided for the transmission;

transmitting the selected data packets to the motor vehicle;

transmitting, in response to user request for the bandwidth of the communication connection, expected values of the bandwidth of the communication connection along the assumed route of the motor vehicle, wherein if the expected values of the bandwidth are below a threshold value, the resolution of the display is reduced; and representing visual map information of the data packets transmitted to the motor vehicle by the display.

2. The method according to claim 1, wherein the transmitting includes transmitting the selected data packets in the selected sequence.

3. The method according to claim 1, wherein the transmitting includes transmitting the selected data packets to the motor vehicle via the communication connection.

4. The method according to claim 1, wherein the selection is performed as a function of permissible driving directions.

5. The method according to claim 1, wherein data packets are provided for transmission to the motor vehicle, which at a certain resolution of the display are displayable on the display along the assumed route of the motor vehicle.

6. The method according to claim 5, wherein the sequence of the data packets provided for transmission to the motor vehicle is a function of a proximity of a region represented by the data packets with respect to the location of the motor vehicle.

7. The method according to claim 5, wherein, from among the data packets provided for transmission to the motor vehicle, the data packets concerning regions that are closer to the location of the motor vehicle are transmitted before the data packets concerning regions that are further away from the location of the motor vehicle.

8. The method according to claim 1, wherein near a route junction, data packets are provided for transmission to the motor vehicle, which at a certain resolution of the display are allocated to regions which touch a circle around the route junction having a diameter corresponding to a screen size of the display.

9. The method according to claim 1, wherein, if the bandwidth of the communication connection is not fully utilized, near a route junction, at least one additional data packet is provided for transmission to the motor vehicle, which is situated at the route junction, but not along the assumed route of the motor vehicle.

10. A navigation system for a motor vehicle, comprising:
an offboard data memory, spatially separated from the motor vehicle, having data packets, divided by region, of visual map information;
a wireless communication connection having a bandwidth between the offboard data memory and the motor vehicle configured to transmit selected data packets to the motor vehicle;
a display arranged in the motor vehicle and configured to represent visual map information of data packets transmitted to the motor vehicle; and
a computation device configured to select at least one of (a) data packets provided for transmission to the motor vehicle or (b) a sequence of the data packets, the computation device configured to select as a function of at least one of (a) a resolution of the display, (b) at least one of (i) a chosen or (ii) an available resolution of data, (c) a location of the motor vehicle, (d) an assumed route of the motor vehicle or (e) the bandwidth of the wireless communication connection;
wherein the wireless communication connection is configured to transmit, in response to user request for the bandwidth of the wireless communication connection, expected values of the bandwidth of the wireless communication connection along the assumed route of the motor vehicle,
wherein if the expected values of the bandwidth are below a threshold value, the resolution of the display is reduced.

11. The navigation system according to claim 10, further comprising an onboard navigation system configured to calculate a suggested route for the motor vehicle.

12. The method according to claim 1, wherein the expected values of the bandwidth of the wireless communication connection along the assumed route of the motor vehicle are determined as a function of at least one of historical or real-time values of the bandwidth of the wireless communication connection along the assumed route.

13. The navigation system according to claim 10, wherein the computation device is configured to determine the expected values of the bandwidth of the wireless communication connection along the assumed route of the motor vehicle as a function of at least one of historical or real-time values of the bandwidth of the wireless communication connection along the assumed route.

* * * * *